(12) United States Patent
Dyer et al.

(10) Patent No.: US 10,701,213 B2
(45) Date of Patent: Jun. 30, 2020

(54) DYNAMICALLY GENERATING AN AGGREGATION ROUTINE

(71) Applicant: Suse LLC, Wilmington, DE (US)

(72) Inventors: Daniel Dyer, Boise, ID (US); Atul Aggarwal, Sunnyvale, CA (US); Ashwin Arvind Agate, Sunnyvale, CA (US)

(73) Assignee: Suse LLC, Wilmington, DE (US)

( * ) Notice: Subject to any disclaimer, the term of this patent is extended or adjusted under 35 U.S.C. 154(b) by 226 days.

(21) Appl. No.: 15/505,319

(22) PCT Filed: Sep. 5, 2014

(86) PCT No.: PCT/US2014/054364
§ 371 (c)(1),
(2) Date: Feb. 21, 2017

(87) PCT Pub. No.: WO2016/036386
PCT Pub. Date: Mar. 10, 2016

(65) Prior Publication Data
US 2017/0279970 A1   Sep. 28, 2017

(51) Int. Cl.
*H04M 15/00* (2006.01)
*H04L 29/08* (2006.01)

(52) U.S. Cl.
CPC .......... *H04M 15/41* (2013.01); *H04M 15/44* (2013.01); *H04M 15/51* (2013.01); *H04M 15/61* (2013.01); *H04L 67/10* (2013.01)

(58) Field of Classification Search
CPC ..... G06Q 30/04; H04L 12/14; H04L 12/1403; H04L 12/1432
See application file for complete search history.

(56) References Cited

U.S. PATENT DOCUMENTS

| 7,024,468 B1 * | 4/2006 | Meyer ............... H04L 41/08 709/220 |
| 8,447,707 B2 | 5/2013 | Massie et al. |

(Continued)

OTHER PUBLICATIONS

Das, M., "New EMC ECS Appliance ViPR 2.0 Redefine What's Possible Storage Management Globally Distributed Customers," (Web Page), EMC2, EMC Pulse, Product & Technology Blog, May 5, 2014, 3 pages.
FIWARE, "FI-WARE Cloud Hosting," FI-WARE Forge Wiki, (Web Page), Mar. 27, 2014, 25 pages.

(Continued)

*Primary Examiner* — Shean Tokuta
(74) *Attorney, Agent, or Firm* — Schwegman Lundberg & Woessner, P.A.

(57) ABSTRACT

Example implementations relate to dynamically generating an aggregation routine. For example, a computing device may include a processor. The processor may receive a data record from a particular service source of a plurality of service sources in communication with the computing device. The data record may relate to usage of the particular service source. The processor may identify at least one field associated with the data record and convert the data record to a standardized record associated with metadata based on the at least one field. The standardized record may have a standardized record format. The processor may dynamically generate an aggregation routine based on the standardized record and the metadata associated with the standardized record. The aggregation routine may be used to calculate usage data associated with the usage of the particular service source.

15 Claims, 5 Drawing Sheets

(56) References Cited

U.S. PATENT DOCUMENTS

| | | | |
|---|---|---|---|
| 8,447,721 B2 | 5/2013 | Eshleman et al. | |
| 8,874,732 B1* | 10/2014 | Sukumaran | H04L 41/5038 |
| | | | 709/200 |
| 10,116,732 B1* | 10/2018 | Canton | H04L 41/0813 |
| 2005/0065879 A1 | 3/2005 | Birch et al. | |
| 2007/0174192 A1 | 7/2007 | Gladwin et al. | |
| 2009/0018996 A1 | 1/2009 | Hunt et al. | |
| 2010/0185534 A1* | 7/2010 | Satyavolu | G06Q 10/063 |
| | | | 705/30 |
| 2012/0116937 A1 | 5/2012 | Van Biljon | |
| 2012/0158655 A1 | 6/2012 | Dove et al. | |
| 2012/0209992 A1* | 8/2012 | Albaugh | G06Q 10/06316 |
| | | | 709/224 |
| 2013/0211555 A1 | 8/2013 | Lawson et al. | |
| 2014/0032531 A1 | 1/2014 | Ravi et al. | |
| 2014/0074562 A1* | 3/2014 | Deng | G06Q 10/06315 |
| | | | 705/7.39 |
| 2014/0164441 A1 | 6/2014 | Rooks et al. | |
| 2014/0172560 A1* | 6/2014 | Satyavolu | H04M 15/805 |
| | | | 705/14.53 |
| 2015/0170175 A1* | 6/2015 | Zhang | G06Q 30/0204 |
| | | | 705/7.33 |
| 2017/0078922 A1* | 3/2017 | Raleigh | H04L 69/18 |

OTHER PUBLICATIONS

Informatica, "End-to-End Data Integration Platform," PowerCenter: Editions Advanced & Standard, (Web Page), retrieved from the Internet Jul. 2014, 2 pages.

International Searching Authority, "Notification of Transmittal of the International Search Report and the Written Opinion" received in PCT Application No. PCT/US2014/054364, dated Apr. 30, 2015, 12 pages.

Kiyanchuk, R., "Openstack Metering Using Ceilometer,", Pure Play OpenStack (Web Page), Jul. 3, 2013, 17 pages.

Li, F. et al., "Distributed Data Management Using Mapreduce," (Research Paper), ACM Computing Surveys (CSUR) 46.3, vol. 0, No. 0, Article A, 2014, 41 pages.

Sekar, V. et al., "Verifiable Resource Accounting for Cloud Computing Services," (Research Paper), Proceedings of the 3rd ACM Workshop on Cloud Computing Security Workshop, 2011, pp. 21-26.

* cited by examiner

DYNAMICALLY GENERATING AN AGGREGATION ROUTINE

BACKGROUND

The use of cloud computing services has grown in recent years. These services may be useful for business entities or individual users. A public cloud provider may offer a number and variety of cloud services that may be metered and billed to users. These services may be metered and billed in a variety of ways using varying types of units of measure.

BRIEF DESCRIPTION OF THE DRAWINGS

Some examples of the present application are described with respect to the following figures.

DETAILED DESCRIPTION

Figure 1:
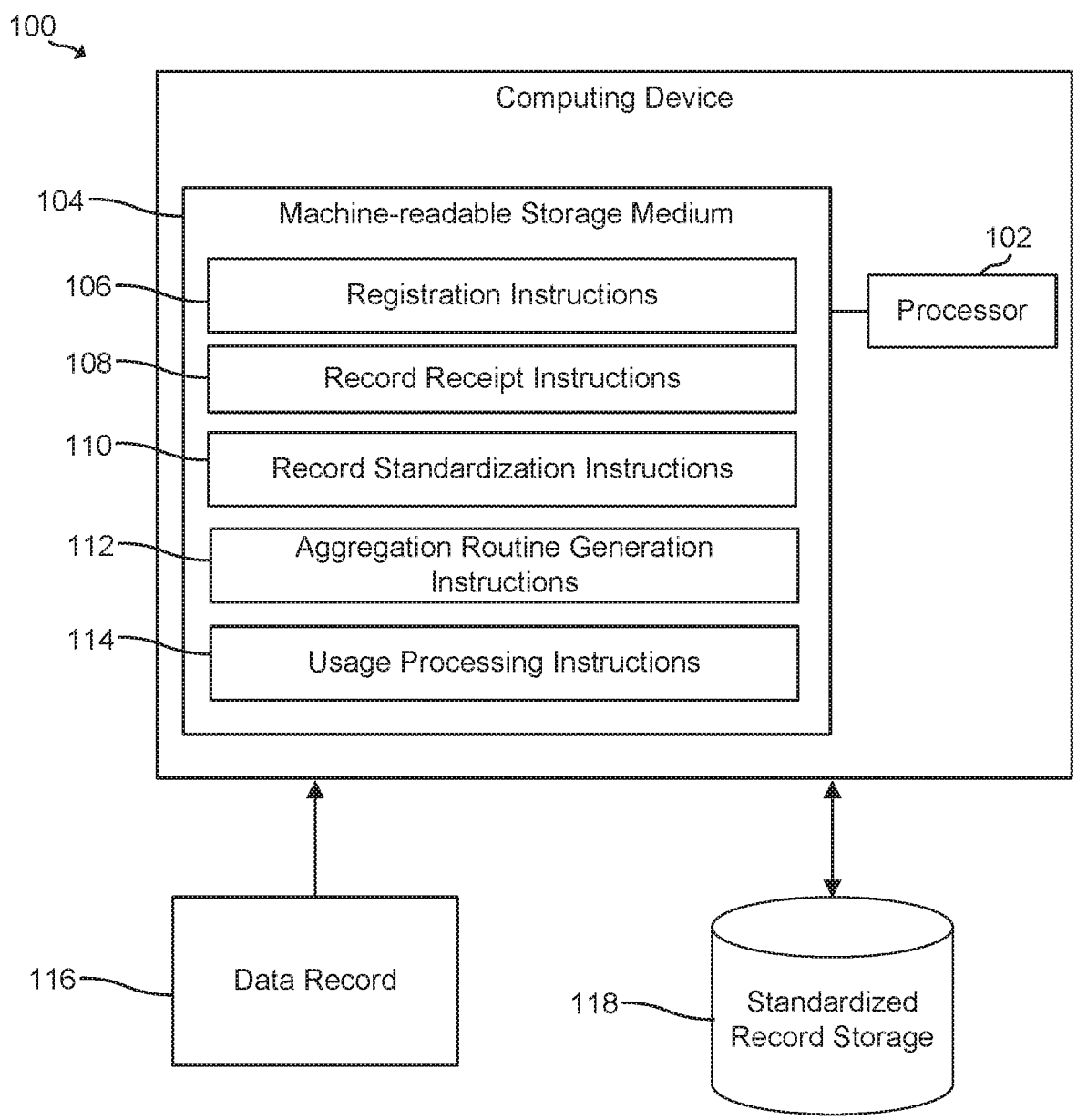
FIG. 1 is a block diagram of an example computing device for dynamically generating an aggregation routine.

As described above, cloud computing services are useful for business and individual users. A provider of cloud computing and storage infrastructure as well as platform services may offer a number and variety of services. The provider may provide these services from any number of service sources that may each be associated with a billing system for metering and billing these services to users. Such a billing system may include a hard-coded metering and billing process for each of the services provided, which may include specialized aggregation algorithms for each of the services. For example, if a public cloud provider offered ten cloud services each from a different service source, a billing system for each of the ten cloud services may be hard-coded. As new services from new service sources are added, the billing system for each new service is also hard-coded.

A dynamic aggregation routine generator may be used to process data records from a plurality of different service sources with varying data record formats on the fly without having to hard-code metering and billing processes for each of the services. The dynamic aggregation routine generator may create an aggregation routine on the fly using one or more reusable scripts that may be run on the fly. Because the pipeline for processing data records for metering and billing is built dynamically, metering and billing for different services may be processed as data records are received from the plurality of different service sources.

Additionally, the dynamic aggregation routine generator provides a self-registration process for any new services to be provided by the cloud provider without having to hard-code metering and billing processes for the new services. The dynamically generated aggregation routines may allow new services to self-register with the cloud provider by indicating metrics that are to be collected and aggregated. Once a new service is self-registered, an aggregation routine may be dynamically created, and data may be processed for the new service without manual intervention.

Metering of cloud services is the process of collecting and processing information about usage that has occurred in the cloud provider system. The information collected may include information such as who used the service, what type of service was used, when the service was used, how much of the service was used and can be billed, and the like. The collected information is aggregated using a billing model to determine the usage. A billing model may be a unique set of business rules used to calculate the usage of a service. The dynamic aggregation routine generator may be part of a metering and billing system of the cloud provider that enables the measurement of and charges for service usage at a granular level using the dynamically generated aggregation routine, which may be a process of translating low-level data records into billable records. The metering and billing system may convert raw data records relating to usage of a service source and system logs and events into billable records represented as units of measure using the dynamically generated aggregation routine.

The dynamically generated aggregation routine allows the raw data records sent from service sources to be processed as well as reprocessed. For example, data record updates (e.g., additions, deletions, modifications, etc.) may be received from service sources updating data records previously sent for any variety of reasons. For example, a service source may have originally sent incorrect or incomplete data, or the service source may have a dependency on a third-party provider to send data, and the data may be delayed by the third-party. The dynamically generated aggregation routine provides the ability to reprocess the previously sent data record based on the update to generate updated aggregated billing records.

Different billing models may have commonalities, and the commonalities may be used to identify general billing models used to dynamically generate aggregation routines for any billing model. For example, a billing model that charges usage based on a state-based hourly instance may receive data records with state events from the service source for each instance that is running. The service source may send a data record periodically and/or each time a new instance is created, deleted, or changes state. The aggregation routine may convert these events into a sum of the total hours during the billing day by looking for events for each hour of the day during which the instance was in an active state. In another example, a billing model that charges usage based on an average usage per day may receive data records indicating usage at periodic times and may process the data records to an average usage for the billing period. Examples of this type of billing model may include block and/or object storage. In another example, a billing model that charges usage based on a summation of a quantity may receive data records that periodically report a quantity of a particular metric used, and the quantities reported may be combined to determine the total usage at the end of a billing period. In another example, a billing model that charges usage based on a maximum of a quantity may receive data records that periodically report a quantity of a particular metric. The maximum value for a billing period may be determined and reported for that billing period. These general billing models may be used to write reusable scripts to dynamically generate aggregation routines for any specific type of billing model used by a particular service source.

In some examples, Apache™ Hadoop® and MapReduce are used to split and process data in parallel across a cluster of commodity machines. MapReduce performs data reduction and computations on data stored in a Hadoop Distributed File System™ (HDFS™). Apache™ Pig, which is built on top of Apache™ Hadoop®, provides a high-level data flow language called Pig Latin to write the dynamically generated aggregation routines. Pig Latin has a natural syntax for describing how to manipulate the flow of processing and is extensible through the use of user defined functions (UDFs). UDFs may give users the ability to load, process, and store data to the HDFS™ in any suitable format. Pig Latin may convert data flow operations into Map Reduce jobs that may be executed on the Hadoop cluster. In some examples, dynamically generated aggregation routines may be defined using Pig Latin and UDFs to provide a data-driven approach to implementing aggregation routines. The aggregation routines may perform functions by looking up variations and/or runtime parameters in external driver tables and may provide an ability to reprocess data without manual intervention.

The process of creating billing records using a dynamically generated aggregation routine may include converting raw data records received from at least one service source to standardized data records each having a standard record format and processing the standardized data records using a dynamically generated aggregation routine. Raw data record conversion may include receiving the raw data record from one or more service sources. The data record may include any suitable information associated with usage of a service provided by the service source. For example, the data record may include information about the start of an instance, the deletion of an instance, whether the instance exists, whether the instance was in a usable state, an amount of usage time, an event type, and the like. One or more event fields associated with the data record (e.g., an event type) may be identified and compared with supported event fields in configuration tables managed by the cloud provider. If the event field is not recognized, this occurrence is logged and managed at a later time. Once the event field is recognized, the event format of the data record is validated by determining expected fields in the event payload using the configuration tables. The event fields are extracted, and a standardized data record is generated using the extracted event fields and metadata associated with the extracted event fields. The standardized data record is stored with the metadata in a standardized record storage with other standardized data records ready to be processed.

When standardized data records are to be processed, the cloud provider may determine which standardized data records to process based on a processing status and may access the appropriate standardized data records for processing. An aggregation routine is dynamically generated based on the standardized data records and their associated metadata. The aggregation routine is dynamically generated based on the metadata using reusable aggregation components. The dynamically generated aggregation routine is used to process the standardized data records such that the usage data can be billed.

Referring now to the figures, FIG. 1 is a block diagram of an example computing device 100 for dynamically generating an aggregation routine. As used herein, an aggregation routine is a process of translating low level data entries from a service source to billable records that indicate usage of the service provided by the service source. As described above, the aggregation routine is dynamically generated when data from a service source is received. For example, the aggregation routine is created on the fly when data from a service source is received and ready to be metered and billed.

Computing device 100 may be, for example, a web-based server, a local area network server, a cloud-based server, a notebook computer, a desktop computer, an all-in-one system, a tablet computing device, a mobile phone, an electronic book reader, a printing device, or any other electronic device suitable for dynamically generating an aggregation routine. Computing device 100 may include a processor 102 and a machine-readable storage medium 104. Computing device 100 may receive and process any data records received from any number of service sources, such as data record 116. As described above, data record 116 may be any record in any suitable format containing any suitable data associated with an entity's usage of a service source.

Processor 102 is a tangible hardware component that may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, 110, 112, and 114 to control a process of dynamically generating an aggregation routine. As an alternative or in addition to retrieving and executing instructions, processor 102 may include at least one electronic circuit that includes electronic components for performing the functionality of instructions 106, 108, 110, 112, 114, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, 110, 112, and 114 for receiving a data record (e.g., data record 116) relating to usage of a particular service source of a plurality of service sources in communication with the computing device; determining and/or identifying at least one field associated with the data record; transforming, changing, and/or converting the data record to a standardized record associated with metadata based on the at least one field; dynamically creating and/or generating an aggregation routine on the fly based on the standardized record and the metadata; and determining and/or calculating, using the aggregation routine, usage data associated with the usage of the particular service source.

Registration instructions 106 may manage and control registration of new services from services sources. When a new service is to be provided, the service source may self-register the service by providing a billing model and billing attributes associated with the new service. The billing model and billing attributes may be validated, and the system may automatically configure settings (e.g., driver tables) for dynamically generating an aggregation routine. For example, a new service may indicate the types of events that may be generated by the service and the type of service usage to bill, and driver tables may be automatically created and configured to process the data by dynamically generating a corresponding aggregation routine.

Record receipt instructions 108 may manage and control receipt of data records (e.g., data record 116) from one or more service sources. For example, record receipt instructions 108 may receive data record 116 from a particular service source in communication with computing device 100.

Record standardization instructions 110 may manage and control the conversion of the data records (e.g., data record 116) from service source to a standardized data record having a standardized record format used by computing device 100. For example, record standardization instructions 110 may identify at least one field associated with data record 116 received from a service source, convert data record 116 to a standardized record with a standardized record format based on the field identified, and store the standardized data record in standardized record storage 118. Standardized record storage 118 may be any suitable storage device capable of storing, retrieving, and accessing data records. The standardized records in standardized record storage 118 may have a standard format with metric metadata associated with the standardized record. This may simplify subsequent processing of a standardized record. For example, if a standardized record has more than one metric to be aggregated, the original data record may be replicated by a record generator such that a metric of set of metrics may be processed independently without having any dependency on the original data record.

Aggregation routine generation instructions 112 may manage and control the dynamic generation of an aggregation routine for processing standardized data records to obtain billing information. For example, aggregation routine generation instructions 112 may access standardized data records from standardized record storage 118 and dynamically generate an aggregation routine based on metadata associated with the accessed records.

Aggregation processing using a dynamically generated aggregation routine may be driven by a set of aggregation driver tables. The aggregation tables may be any suitable data sources. In some examples, the aggregation tables are Apache Hive™ tables. Aggregation driver tables may be populated programmatically using input that may be provided during the service registration process. For example, for a self-registration process of a new service, the service source of the new service may specify information such as a billing model associated with the new service, metrics in the raw data that may be aggregated on, an aggregation specification that may build an aggregation routine on the fly, and any additional suitable information such as aggregation states (e.g., a list of billable and non-billable status events), units of measure, service categories, and the like.

External driver tables may also be used to supply information associated with metering and billing for a particular service, such as a list of states for calculating hourly state-based usage, a resulting unit of measure, a quantity divisor, an aggregation specification specifying components that may be used to create a dynamic Pig Latin script, and the like. For example, a metric workflow driver table may have an aggregation_params column of map data type and may contain aggregation parameters as key-value pairs to drive aggregation. These parameters may include any suitable parameters, such as an aggregation_specification parameter that is a JavaScript Object Notation (JSON) representation of the generalized aggregation components, an aggregation_uom parameter that may give a unit of measure string that may be attached to the final aggregated result, an aggregation_states parameter that includes information about various states as defined by the service source and whether each of those states are billable or non-billable, and the like. In another example, a workflow driver table may indicate whether a set of metrics that are to be aggregated would use custom one-off Pig Latin script (e.g., to support legacy custom Pig Latin scripts) or dynamically generated aggregation Pig Latin scripts.

Usage processing instructions 114 may manage and control the calculation of usage data associated with usage of a service using the dynamically generated aggregation routine. For example, once the aggregation routine is dynamically generated, the aggregation routine may be used to process one or more standardized data records to calculate usage data associated with the standardized data records.

Figure 2:
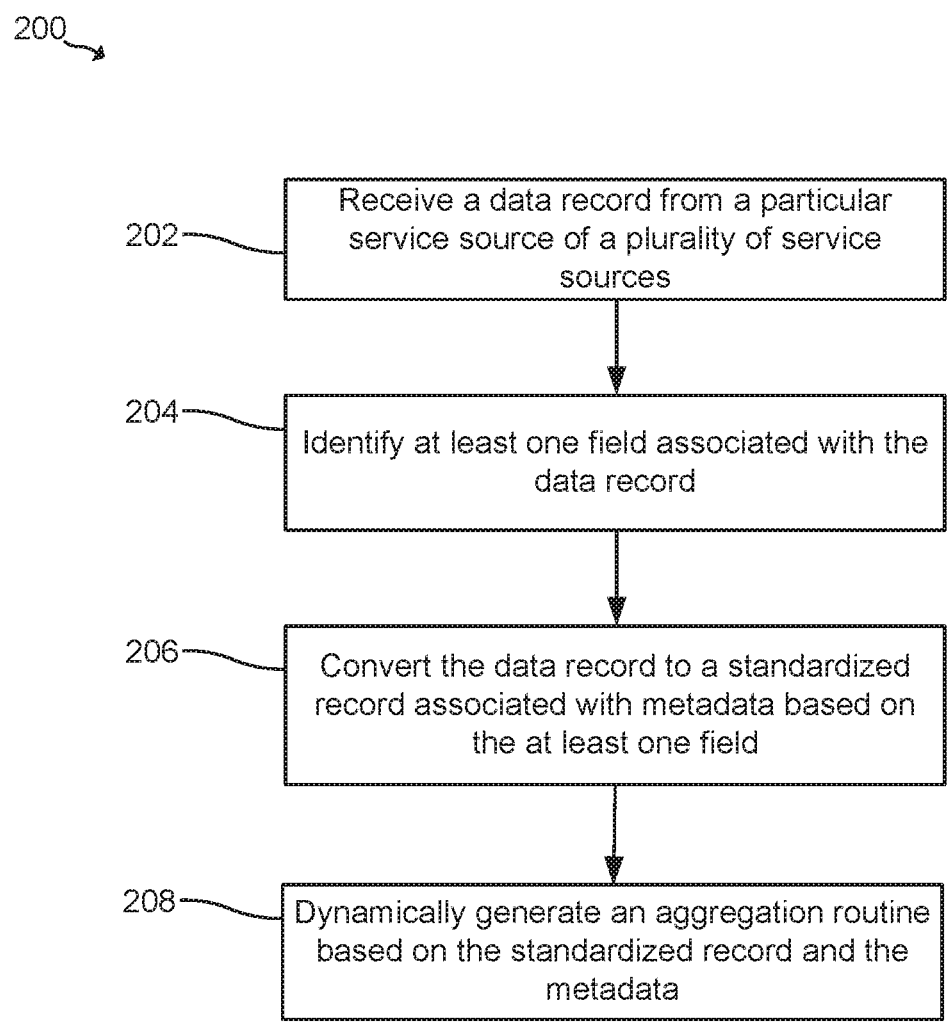
FIG. 2 is a flowchart illustrating an example method of dynamically generating an aggregation routine.

FIG. 2 is a flowchart illustrating an example method 200 of dynamically generating an aggregation routine. Method 200 may be implemented using computing device 100 of FIG. 1.

Method 200 includes, at 202, receiving a data record from a particular service source of a plurality of service sources. The data record may be related to usage of the particular service source. For example, the data record may relate to an hourly instance usage, an average usage per day, and the like.

Method 200 also includes, at 204, identifying at least one field associated with the data record. For example, an event field designating an event type associated with the data record may be identified.

Method 200 also includes, at 206, converting the data record to a standardized record associated with metadata based on the at least one field. The standardized record may be in a standardized record format. The standardized record format may be a format associated with the cloud provider.

Method 200 also includes, at 208, dynamically generating an aggregation routine based on the standardized record and the metadata associated with the standardized record. The aggregation routine may be used to calculate usage data associated with the usage of the particular service.

Figure 3:
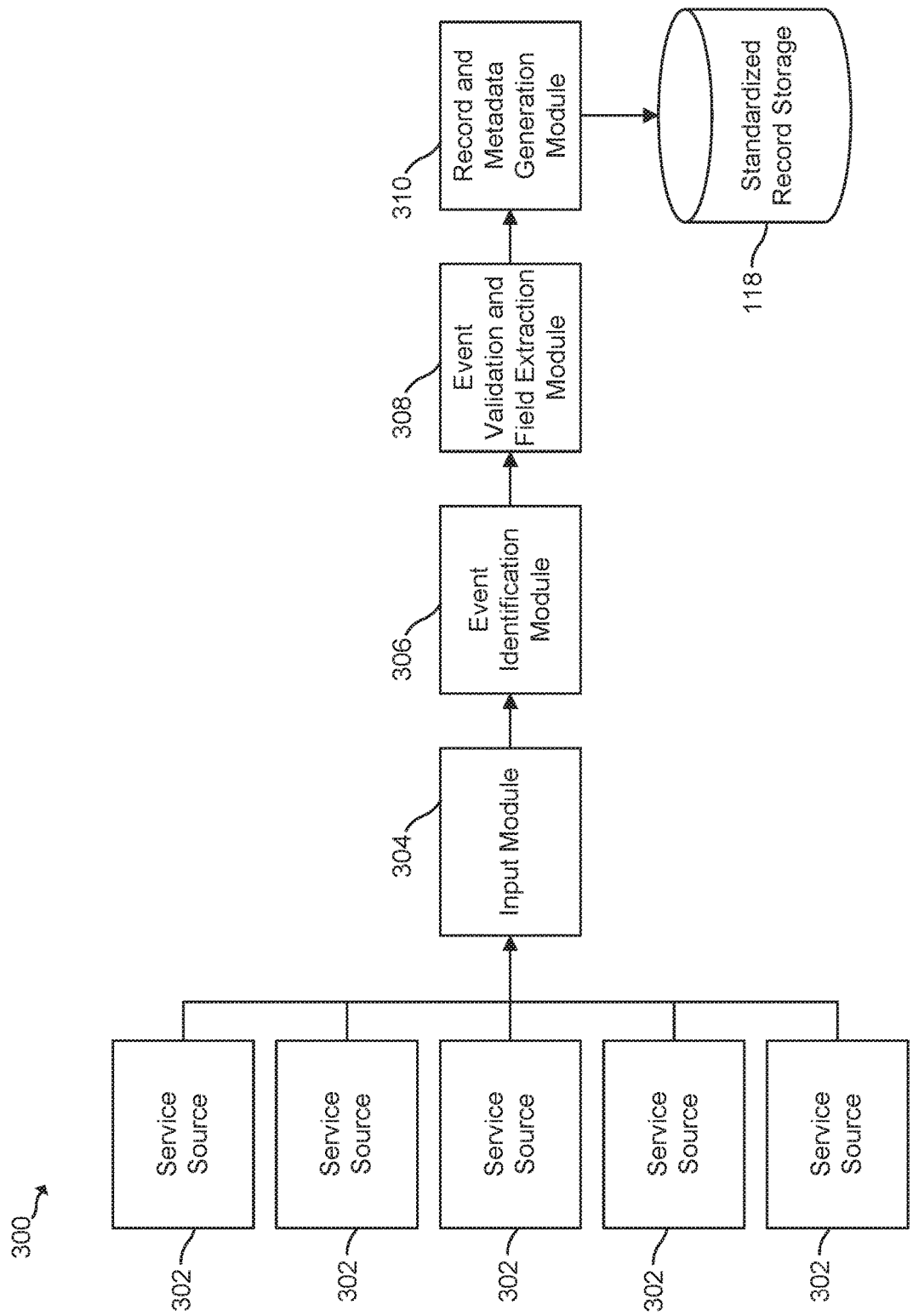
FIG. 3 is a block diagram of an example system for generating and storing standardized records.

FIG. 3 is a block diagram of an example system 300 for generating and storing standardized records. System 300 may include any number of service sources 302 that each provide a particular service to users through a cloud provider. Services provided by each of the service sources 302 may include any suitable cloud service, such as a Platform as a Service (PaaS), Database as a Service (DBaaS), Monitoring as a Service (MaaS), and the like. Service sources 302 may each publish their data in a variety of formats.

A service source 302 may send a data record associated with usage to input module 304 of system 300. Input module 304 may be a hardware-implemented and/or a processor-implemented module that may receive the data record such that the data record may enter the processing stream.

The input module 304 sends the data record to event identification module 306, which may be a hardware-implemented and/or a processor-implemented module. In some examples, event identification module 306 may be implemented using Pig Latin script and Pig UDFs and may be governed by data in the aggregation driver table that may list mappings between event types, required fields, metrics to be derived from each event type, and the like. Event identification module 306 may identify one or more event fields (e.g., event type) in the data record. The identified event field may be compared with events supported by the cloud provider as indicated in the configuration database of the cloud provider. In some examples, if the event field cannot be identified because the event field is not recognized, this occurrence may be logged for later processing.

Event identification module 306 sends the data record with the identified event field to event validation and field extraction module 308, which may be a hardware-implemented and/or a processor-implemented module. In some examples, event validation and field extraction module 308 may be implemented using Pig Latin script and Pig UDFs and may be governed by data in the aggregation driver table that may list mappings between event types, required fields, metrics to be derived from each event type, and the like.

Event validation and field extraction module 308 may validate the format of the data record by determining if expected fields are included in the event payload of the data record. This may be determined using the configuration database of the cloud provider. Event validation and field extraction module 308 may extracted the expected fields from the data record.

Event validation and field extraction module 308 may send the data record with the extracted fields to record and metadata generation module 310, which may be a hardware-implemented and/or a processor-implemented module. In some examples, record and metadata generation module 310 may be implemented using Pig Latin script and Pig UDFs and may be governed by data in the aggregation driver table that may list mappings between event types, required fields, metrics to be derived from each event type, and the like. Record and metadata generation module 310 may use the extracted fields to generate a standardized data record having a standardized record format. Record and metadata generation module 310 may also generate metadata associated with the standardized data record. The metadata generated may describe the raw usage and processed data associated with the data record. The standardized data record and associated metadata generated by record and metadata generation module 310 may be sent to standardized record storage 118 such that the standardized data record and associated metadata may be stored for further processing. In some examples, standardized record storage 118 may be stored in HDFS, and the associated metadata may be stored in Apache Hive™.

In some examples, JSON may be used for the data record sent from service sources 302. Generating the standardized data record may include standardizing various fields in the JSON data record using a metering data format specification, which may describe how to standardize the various fields. For example, a data record may include a timestamp field and a payload object. Payload may include fields such as tenant_id, instance_id, audit_period_beginning timestamp, audit_period_ending timestamp, availability_zone, and metrics. Metrics may be an array containing metric name, value, and type. These fields may be standardized using the metering data format specification to generate the standardized data record.

In some examples, service sources 302 may publish data records to service message queues. Service message queue collectors may collect the data records and bundle up the data records into JSON log files. The JSON log files may be copied to the HDFS™ and may be ingested into cloud_raw and/or ceilo_raw Hive™ tables (e.g., depending on the service message queue collector). Cloud_raw and ceilo_raw may use a custom JSON Hive Serializer Deserializer (JSON Hive™ SerDe) to read the JSON data.

In some examples, the data records sent from service sources 302 may be organized into a series of Apache Hive™ tables, which may allow partition metadata to be associated with the data record being processed. The Apache Hive™ tables may facilitate querying and managing of large datasets residing in distributed storage. Apache Hive™ may provide a mechanism to project structure onto the data and query the data using HiveQL, which is a language similar to a structured query language (SQL). Apache™ HCatalog includes a set of interfaces that open access to an Apache Hive™ metastore for tools inside and outside of the Hadoop® grid. HCatalog may also provide access to Apache Hive™ metadata and shared schema and data type mechanism for other Hadoop® tools, such as Apache™ Pig.

Figure 4:
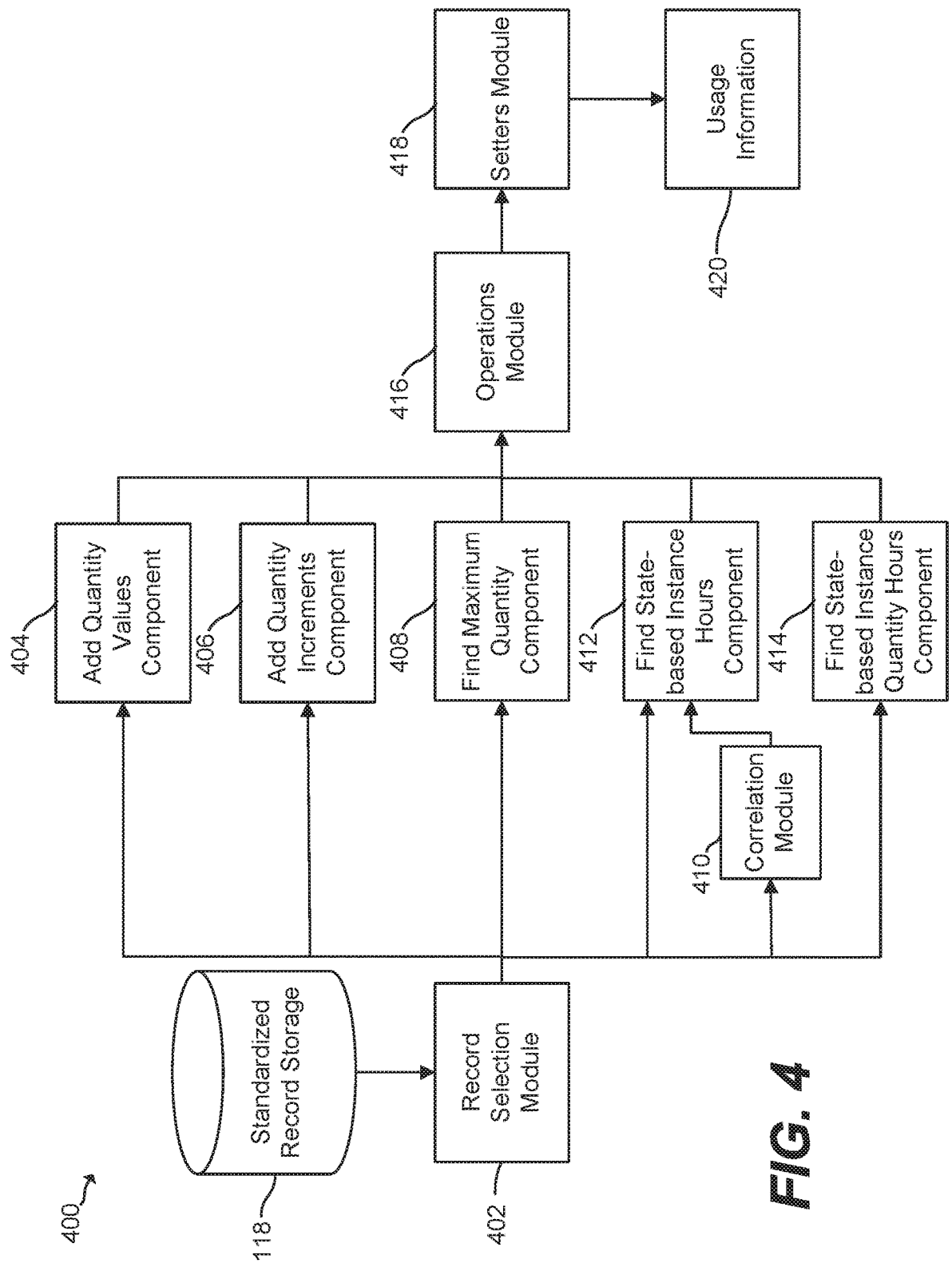
FIG. 4 is a block diagram of an example system for generating usage information using a dynamically generated aggregation routine.

FIG. 4 is a block diagram of an example system 400 for generating usage information 420 using a dynamically generated aggregation routine. When standardized data records are ready to be processed, system 400 may access the standardized data records from standardized record storage 118 and may send the standardized data records to a record selection module 402, which may be a hardware-implemented and/or a processor-implemented module. Record selection module 402 may route the standardized data records to the appropriate processing component based on the event type indicated by the metadata associated with each standardized data record. For example, record selection module may route a standardized data record to add quantity values component 404, add quantity increments component 406, find maximum quantity component 408, find state-based instance hours component 412, or find state-based instance quantity hours component 414. Add quantity values component 404 may be a hardware-implemented and/or a processor-implemented component that may determine usage based on the addition of quantity values of a particular unit of measure (e.g., delta of additional quantity units). Add quantity increments component 406 may be a hardware-implemented and/or a processor-implemented component that may determine usage based on the addition of quantity increments of a particular unit of measure (e.g., addition of cumulative quantity increments). Find maximum quantity component 408 may be a hardware-implemented and/or a processor-implemented component that may determine usage based on the maximum quantity of usage of a particular unit of measure. Find state-based instance hours component 412 may be a hardware-implemented and/or a processor-implemented component that may determine usage based on state-based instance hours used. The state-based instance hours component 412 may use correlation module 410, which may be a hardware-implemented and/or a processor-implemented module, to correlate instance data. Find state-based instance quantity hours component 414 may be a hardware-implemented and/or a processor-implemented component that may determine usage based on state-based instance quantity hours used.

After the appropriate processing component has processed the standardized data records, a dynamically generated aggregation routine may be generated based on the metadata associated with the standardized data record to aggregate the usage data processed. In some examples, the aggregated usage data may be sent to operations module 416, which may be a hardware-implemented and/or a processor-implemented module that may perform any suitable operations on the usage data aggregated. For example, operations module 416 may divide the resulting quantity by a particular divisor. Additionally, in some examples, the aggregate usage data may be sent to setters module 418, which may be a hardware-implemented and/or a processor-implemented module that may adjust any suitable settings associated with the usage data aggregated. For example, setters module 418 may set an operating system type, set a service category, set a final unit of measure, and the like. After any appropriate operations are performed and settings are adjusted, the aggregated usage data may be provided as usage information 420, which may include any information about usage of cloud services. In some examples, the aggregated usage data may be validated and inputted into a usage table.

Figure 5:
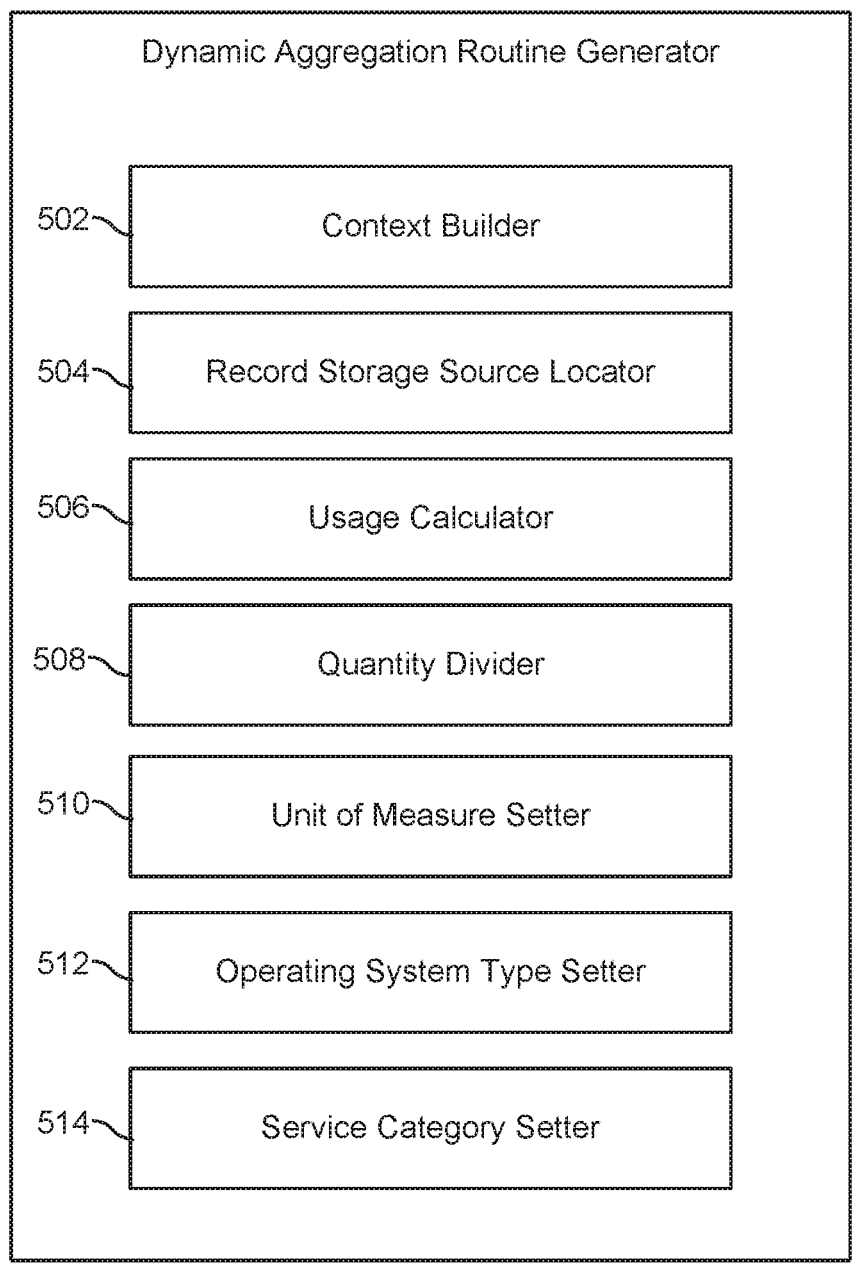
FIG. 5 is a block diagram of an example dynamic aggregation routine generator.

FIG. 5 is a block diagram of an example dynamic aggregation routine generator 500. As described above, the process of aggregation may including using a set of reusable components that may be assembled into a dynamically generated aggregation routine (e.g., a Pig Latin script). In some examples, each of the reusable components may be implemented as a Pig macro, which is a feature of Pig that provides the ability to modularize sets of Pig Latin statements and functions. Pig macros may be similar to functions, have a signature in the form of a set of input arguments, and return a Pig relation. Pig macros may be imported into and used by any Pig Latin script. Component interfaces for each of the reusable components may be standardized by input and output type, which allows for plugability. The reusable components may be extensible, and components may be added and/or modified at any time. As shown in the example of FIG. 5, dynamic aggregation routine generator 500 includes example reusable components that may be assembled into a dynamically generated aggregation routine. The example reusable components of dynamic aggregation routine generator 500 may include context builder 502, record storage source locator 504, usage calculator 506, quantity divider 508, unit of measure setter 510, operating system type setter 512, and service category setter 514.

Context builder 502 of dynamic aggregation routine generator 500 may fetch information from property files and from driver tables such that information to be used for calculating service usage may be collected. Context builder 502 may use the collected information to create a context relation containing property mapping and external driver table data. For example, context builder 502 may fetch data from property files on HDFS™ and external driver tables to create a context Pig relation containing property mapping and external driver table data.

Record storage source locator 504 of dynamic aggregation routine generator 500 may query, locate, and fetch standardized data records from standardized record storage 118 of FIG. 1.

Usage calculator 506 of dynamic aggregation routine generator 500 may calculate service usage based on a billing model specified in a driver table. For example, usage calculator 506 may calculate the number of hours an instance was in a billable state using a state machine and a list of states defined in a driver table, add quantity values, add quantity increments, find a maximum quantity value, and the like.

Quantity divider 508 of dynamic aggregation routine generator 500 may adjust the resulting usage value by a specified divisor and update the usage quantity accordingly.

Unit of measure setter 510 of dynamic aggregation routine generator 500 may set a particular final unit of measure for the resultant usage calculated.

Operating system type setter 512 of dynamic aggregation routine generator 500 may set licensing codes for operating systems and/or applications run by an operating system.

Service category setter 514 of dynamic aggregation routine generator 500 may set a service category associated with a service provided by a service source.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
   a processor to:
   receive a data record from a particular service source of a plurality of service sources in communication with the computing device, the data record relating to usage of the particular service source;
   identify at least one field associated with the data record;
   convert the data record to a standardized record associated with metadata based on the at least one field, the standardized record having a standardized record format, wherein convert includes generation of the metadata to describe the data record and the standardized record;
   dynamically generate an aggregation routine based on the standardized record and the metadata associated with the standardized record, the aggregation routine to calculate usage data associated with the usage of the particular service source for a first metric; and
   replicate the standardized record as a replicated standardized record when the data record includes a second metric that is to be aggregated, wherein the first metric and the second metric can be aggregated independently from the standardized record and the replicated standardized record without dependency on the data record.

2. The computing device of claim 1, wherein the aggregation routine is dynamically generated using the metadata with a set of macros.

3. The computing device of claim 1, wherein the processor is further to:
   receive attributes associated with a new service source;
   determine a billing model associated with the new service source; and
   automatically configure a new aggregation routine associated with the new service source based on the attributes and the billing model.

4. The computing device of claim 1, wherein the processor is further to store the standardized record with a plurality of standardized records.

5. The computing device of claim 4, wherein the processor is further to:
   determine the standardized record of the plurality of standardized records is ready to be processed;
   access the standardized record; and
   send the standardized record to a processing component based on the aggregation routine.

6. A method comprising:
   receiving, by a computing device, a data record from a particular service source of a plurality of service sources in communication with the computing device, the data record relating to usage of the particular service source;
   determining, by the computing device, at least one field associated with the data record;
   transforming, by the computing device, the data record to a standardized record associated with metadata based on the at least one field, the standardized record having a standardized record format, and wherein transforming further includes generating the metadata to describe the data record and the standardized record;

dynamically generating, by the computing device, an aggregation routine based on the standardized record and the metadata associated with the standardized record for a first metric;

replicating, by the computing device, the standardized record as a replicated standardized record when the data record includes a second metric that is to be aggregated; and using the aggregation routine, calculating, by the computing device, usage data associated with the usage of the particular service source for a first metric;

wherein the first metric and the second metric can be aggregated independently from the standardized record and the replicated standardized record without dependency on the data record.

7. The method of claim 6, wherein the aggregation routine is dynamically generated using the metadata with a set of macros.

8. The method of claim 6, further comprising:
receiving, by the computing device, attributes associated with a new service source;
determining, by the computing device, a billing model associated with the new service source; and
automatically configuring, by the computing device, a new aggregation routine associated with the new service source based on the attributes and the billing model.

9. The method of claim 6, further comprising:
storing, by the computing device, the standardized record with a plurality of standardized records.

10. The method of claim 9, further comprising:
determining, by the computing device, the standardized record of the plurality of standardized records is ready to be processed;
accessing, by the computing device, the standardized record; and
sending, by the computing device, the standardized record to a processing component based on the aggregation routine.

11. A non-transitory machine-readable storage medium storing instructions that, if executed by at least one processor of a computing device, cause the computing device to:
receive a data record from a particular service source of a plurality of service sources in communication with the computing device, the data record relating to usage of the particular service source;
identify at least one field associated with the data record;
change the data record to a standardized record associated with metadata based on the at least one field, the standardized record having a standardized record format, and wherein change includes generation of the metadata to describe the data record and the standardized record;
create an aggregation routine on the fly based on the standardized record and the metadata associated with the standardized record for a first metric;
replicate the standardized record as a replicated standardized record when the data record includes a second metric that is to be aggregated; and
determine, using the aggregation routine, usage data associated with the usage of the particular service;
wherein the first metric and the second metric can be aggregated independently from the standardized record and the replicated standardized record without dependency on the data record.

12. The non-transitory machine-readable storage medium of claim 11, wherein the aggregation routine is created on the fly using the metadata with a set of macros.

13. The non-transitory machine-readable storage medium of claim 11, wherein the instructions, if executed by the at least one processor, further cause the computing device to:
receive attributes associated with a new service source;
determine a billing model associated with the new service source; and
automatically configure a new aggregation routine associated with the new service source based on the attributes and the billing model.

14. The non-transitory machine-readable storage medium of claim 11, wherein the instructions, if executed by the at least one processor, further cause the computing device to store the standardized record with a plurality of standardized records.

15. The non-transitory machine-readable storage medium of claim 14, wherein the instructions, if executed by the at least one processor, further cause the computing device to:
determine the standardized record of the plurality of standardized records is ready to be processed;
access the standardized record; and
send the standardized record to a processing component based on the aggregation routine.

* * * * *